(12) United States Patent
McElvain

(10) Patent No.: US 7,295,342 B2
(45) Date of Patent: Nov. 13, 2007

(54) METHOD FOR IDENTIFING OBJECTS ON WHITE BACKGROUND FOR OPTIMIZED RENDERING

(75) Inventor: Jon S. McElvain, Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 969 days.

(21) Appl. No.: 10/608,760

(22) Filed: Jun. 27, 2003

(65) Prior Publication Data

US 2004/0263878 A1 Dec. 30, 2004

(51) Int. Cl.
*H04N 1/60* (2006.01)
*G06K 15/00* (2006.01)

(52) U.S. Cl. ........................................ 358/1.9; 358/2.1

(58) Field of Classification Search ................. 358/1.9, 358/1.2, 1.1, 2.1, 3.03, 3.04, 3.06, 3.07, 3.08, 358/3.09, 3.1, 3.3, 1.15, 518, 521, 525, 533, 358/534, 535, 536; 382/162, 167, 254, 260–269, 382/299, 298, 300
See application file for complete search history.

(56) References Cited

U.S. PATENT DOCUMENTS

| | | | |
|---|---|---|---|
| 5,687,303 A | 11/1997 | Motamed et al. | 358/1.18 |
| 6,006,013 A | 12/1999 | Rumph et al. | 358/1.15 |
| 6,256,104 B1 | 7/2001 | Rumph et al. | 358/1.15 |
| 6,327,043 B1 | 12/2001 | Rumph et al. | 358/1.15 |
| 2005/0036173 A1* | 2/2005 | Hayashi et al. | 358/2.1 |

* cited by examiner

*Primary Examiner*—Dov Popovici
(74) *Attorney, Agent, or Firm*—Jeanette M. Walder

(57) ABSTRACT

A method for optimizing rendering of objects to be printed on a white background, includes identifying an object of a particular type to be printed on a white background, wherein objects of the particular type have predefined rendering hints associated with them, which predefined rendering hints provide optimized rendering of the objects of the particular type on non-white backgrounds; associating a new tag called "object on white" with the identified object; defining a new rendering hint for rendering the object of the particular type on a white background with the identified object; and rendering objects with the object on white tag according to the new rendering hint.

8 Claims, 5 Drawing Sheets

FIG. 1
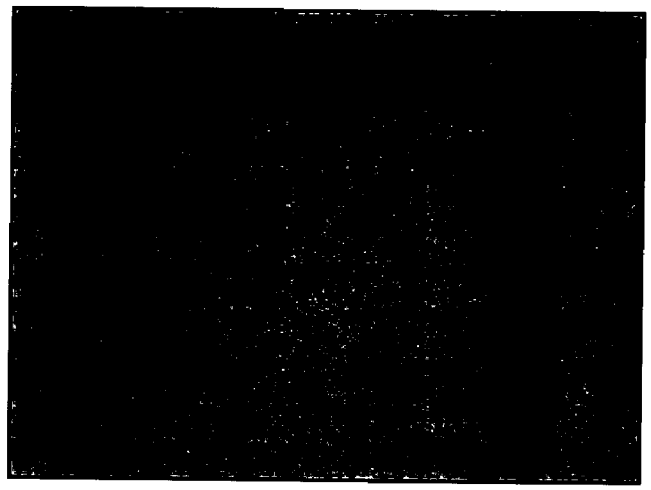
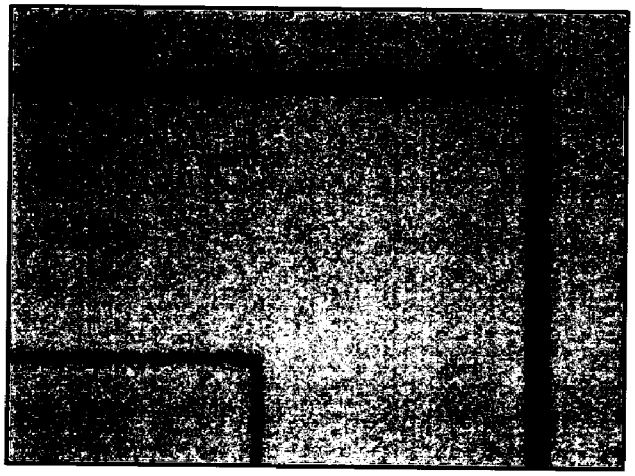
FIG. 2

METHOD FOR IDENTIFING OBJECTS ON WHITE BACKGROUND FOR OPTIMIZED RENDERING

FIELD OF THE INVENTION

This invention relates generally to methods for marking engine characteristics, and more particularly, to a method which identifies objects to be printed on a white background for selection of optimized rendering of the object on white background.

BACKGROUND OF THE INVENTION

Quite common among digital front ends (DFEs) is the ability to identify object types (text, image, strokes, fill, line art, etc.) embedded in a given page description language (PDL) master. This is performed in the interpreter stage, prior to the actual imaging of the objects. These object types can then be used to optimize the processing of the contone data prior to transmission to the print engine. Several print engines now have the capability to accept "tags" or "hints" (in addition to the contone data) to optimize rendering, and these are generally assigned based solely on the object type. These tags or hints are generally specified for the entire object. For other engines, it is possible to supply rendering "hints" or "tags" for each pixel, allowing the engine to optimally render the objects on the page, pixel by pixel.

For example, in a print engine which specifies hints based on objects, all stroke objects might receive the "Stroke" hint, which might instruct the engine to render these objects with the system (e.g., a mid-frequency) halftone. This type of rendering may work well in situations where line art is intersecting a tinted fill background that is rendered with the same screen, avoiding potential screen switching artifacts. However, using the system halftone may not optimize colored text/line art sharpness in the case where these objects exist in isolation on a white background, as edges may appear excessively ragged. Instead, it may be desirable to render these with a higher frequency halftone screen, or even to enable additional edge enhancements (such as outlining). In this sense, there is a need to identify certain objects that exist solely on white background in order to prevent screen switching artifacts and to provide optimized rendering for such objects.

SUMMARY OF THE INVENTION

A method for optimizing rendering of objects to be printed on a white background, according to one aspect of the invention, includes identifying an object of a particular type to be printed on a white background, wherein objects of the particular type have predefined rendering hints associated with them, which predefined rendering hints provide optimized rendering of the objects of the particular type on non-white backgrounds; associating a new tag called "object on white" with the identified object; defining a new rendering hint for rendering the object of the particular type on a white background with the identified object; and rendering objects with the object on white tag according to the new rendering hint. The method may further include providing additional edge rendering hints and associating the object on white tag with the additional edge rendering hints. The object on white object may be an object, such as a text object or a line art object, a run (such as in run length encoded data) or a pixel (or group of pixels).

The method of the invention identifies objects, runs, or pixels on a white background. The newly defined "Detail on White" entities are tagged accordingly (in order to render them more effectively, a new rendering hint is assigned, as well as additional rendering, such as outlining), and the information can then be used to better render them downstream. For example, for Xerox Corporation DocuSP 3.7/iGen3, this method may be used to render line art on a white background with the 212 dot (instead of the system 170 dot) for improved sharpness. All other line art objects (e.g., those that intersect fills) will be assigned the 170 system halftone. The method does not flag text on colored or gray background since the mixture of two screens could produce unwanted artifacts. The method provides good use of rendering tags that provides higher image quality.

The method may be used in cases where the white background corresponds to colors lighter than a specified threshold. Screen switching artifacts may not be visible when certain types of objects are printed on very light color background, but would become more objectionable as the background becomes darker. For example, this might be the case when the specified threshold is at least $L^*=70$ relative to paper white in CIELAB color space (note that lightness increases with increasing $L^*$).

A method for optimized rendering of objects to be printed on a white background, according to another aspect of the invention, includes rendering objects of a specified type that exist on non-white background in a specified manner; and rendering objects of the specified type that exist on white background in a fashion different from those specified objects that exist on a non-white background.

BRIEF DESCRIPTION OF THE DRAWINGS

FIG. 1 is a micrograph showing line art rendering with 170 dot resolution;

FIG. 2 is a micrograph showing line art rendered with 212 dot resolution (plus additional outlining);

DETAILED DESCRIPTION OF THE PREFERRED EMBODIMENTS

Figure 3:
FIG. 3 illustrates screen switching when applying strict object-based halftoning.

The term "data" refers generally to physical signals that indicate or include information. An "image", i.e., a pattern of physical light, may include "image objects" in the form of characters, words, and text as well as other features such as line art, graphics, or graphical structures. An image may be divided into "segments," each of which is itself an image. A segment of an image may be of any size up to and including the whole image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. Although described herein as being particularly applicable to continuous-tone processing, the present invention applies equally as well to the processing of color images, wherein each separation is treated, effectively, as a gray-scale or continuous-tone image. Accordingly, references herein to the processing of continuous-tone (contone) or gray-scale images is intended to include the processing of color image separations as well. An operation typically performs "image processing" when it operates on an item of data that relates to part of an image.

The term "tag" or "hint" refers to complimentary data to be used in conjunction with the digital contone data to optimally render each pixel of a digital image. Each pixel of the contone plane is assumed to have a corresponding pixel in the tag plane.

An "image input device" is a device that can receive an image and provide an item of data defining a version of the image. A "scanner" is an image input device that receives an image by a scanning operation, such as by scanning a document. An "image output device" is a device that can receive an item of data defining an image and provide or render the image as output. A "display" is an image output device that provides the output image in human viewable form. "Halftoning" refers generally to rendering the digital image to a bit map form that can be used to drive the imaging device and includes a process that prepares the pixels for driving the imaging devices. For printing devices, the halftone image that is created is usually in a form such binary pixels, high addressability pixels, pulse width modulation codes, or some reduced quantization form that is compatible with the imaging device in the printer.

"Graphical features," "line art objects," and "text" typically refer to computer-generated features in an image as opposed to pictorial or natural scene content. The terms may also be used to describe computer-generated features that have been printed and re-digitized with a device such as an input scanner.

The term "white" refers to the case where the marking or rendering device specifies that no ink (pixels) will be placed in a particular region of an image. For images that are halftoned, this implies there will be no halftone pattern specified in this region. White therefore refers to the "white point" of the final medium, corresponding to the coordinates in CIELAB color space of that medium in the absence of any externally produced marking.

As described above, many DFEs have the capability to recognize various object types embedded in PDL masters, for example text, stroke, and fills. These object types can then be used to optimize the processing of the contone data prior to transmission to the print engine. For some engines, for example, Xerox Corporation iGen3 and DC2060, it is also possible to supply rendering "hints" or "tags", for each pixel, allowing the engine to optimally render the page. These tags or hints are in general assigned on the basis of object type, and usually control the halftone used during rendering (although the rendering control can be more sophisticated, as in the case of iGen3).

For large uniform areas (e.g., fills), color accuracy and uniformity are most important with respect to the human perception of overall image quality. Because of this, a lower frequency halftone with many color levels and a high degree of stability would generally be used. In contrast, for line art (and text), edge sharpness rather than color accuracy and uniformity is more important when considering image quality metrics. This would suggest the use of higher halftone frequencies with sharper edges to optimize the rendering of line art objects. Application of this object-based screen assignment works well in the case where line art exists in isolation (e.g., on a white background). Referring to FIG. 1, a micrograph illustrates a line art rendering with the system default 170 dot resolution halftone screen. FIG. 2 is a micrograph showing the same line art rendered with 212 dot resolution halftone screen (plus additional outlining).

However, in the case where tinted line art intersects tinted fill objects, screen switching artifacts may appear at the interfaces. An example of this screen switching artifact (produced as a result of strict object-based halftoning) can be seen near the text edges in the micrograph shown in FIG. 3. The text objects (50% magenta, 100% black) are rendered with the 212 dot, and the (50% magenta) background is rendered with the 170 dot. Several dot gaps can be seen where the 212 magenta text edges intersect the 170 magenta background.

In order to improve the sharpness of isolated line art, and to eliminate screen switching artifacts, it would then be desirable to identify line art (or other) objects, runs, or pixels, that exist only on a white background. These newly identified "Detail on White" entities could then be rendered differently depending on need. Detail on White entities can be entire objects, individual runs, or individual pixels, and are generally assigned a special Detail on White "tag" for proper identification during rendering. This "tag" may be assigned to all pixels that originate from the same object, but it is also possible to have only a subset of the object's runs/pixels assigned this tag. These two cases are illustrated in FIGS. 4 and 5.

Figure 4:
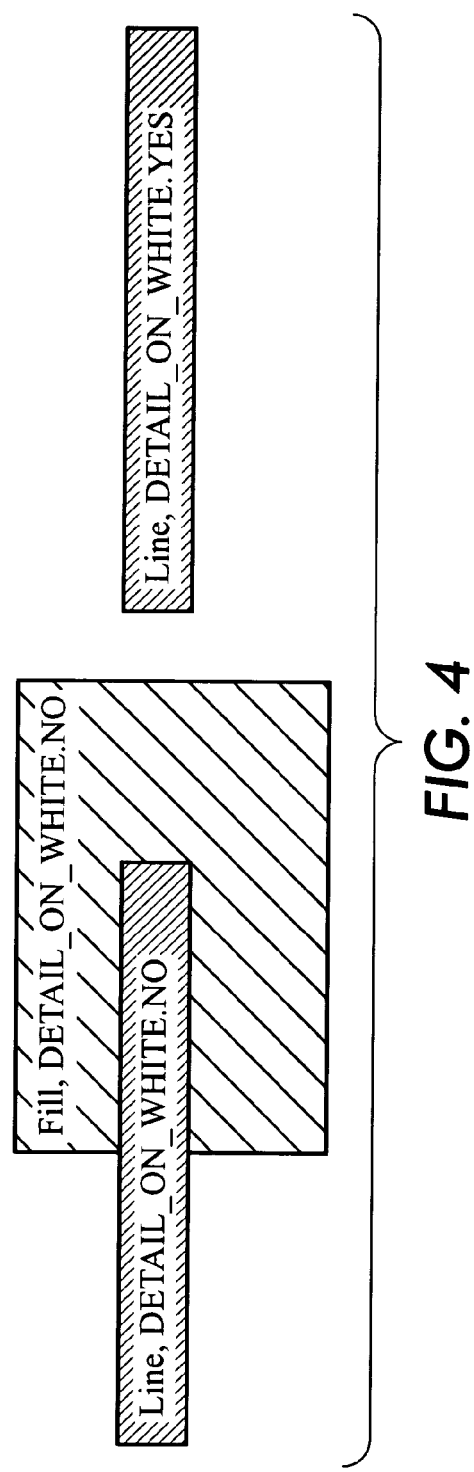
FIG. 4 illustrates a "Detail on White" tag assigned to an object.

FIG. 4 illustrates a "Detail on White" tag assigned to a complete object. Note that in FIG. 4 the line detail to the left of the fill object has not been assigned the "Detail on White" designation (even though it resides half on white and half on the fill object). The line detail to the right of the fill object resides completely on white background and has been assigned the "Detail on White" tag. FIG. 5 illustrates partial assignment of a "Detail on White" tag to an object. Note that in FIG. 5, the line detail to the left of the fill object has a partial assignment of "Detail on White." The portion of the line detail which resides on the white background has the "Detail on White" assignment. The portion that resides on the fill does not.

Figure 5:
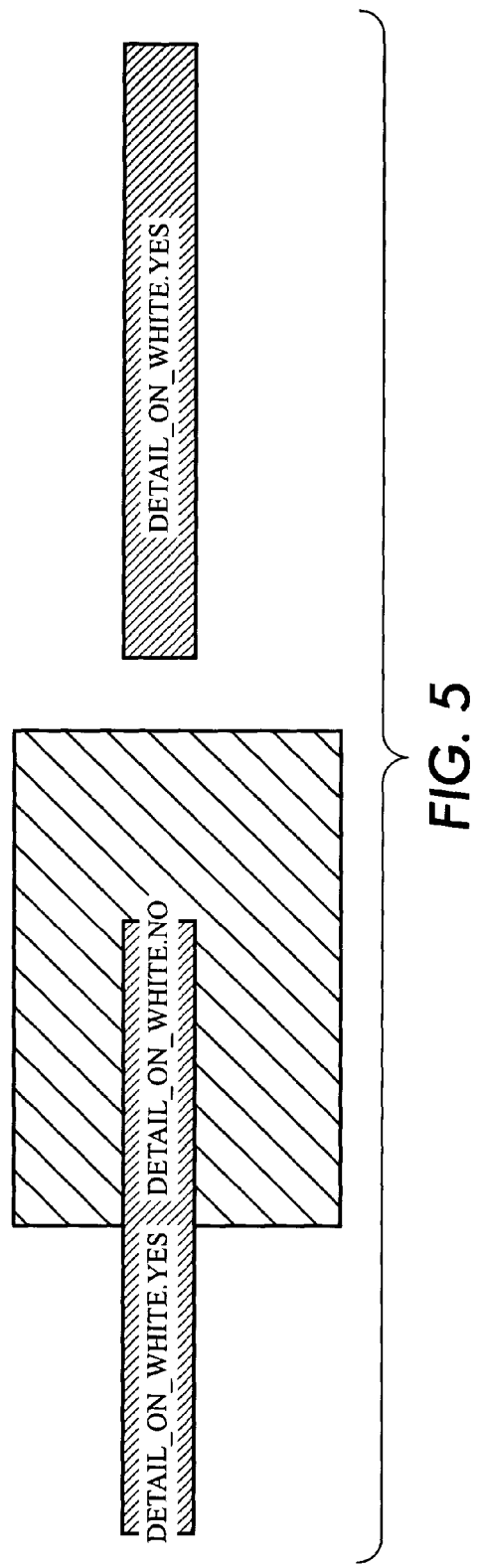
FIG. 5 illustrates partial assignment of a "Detail on White" tag to an object.

The partial assignment in FIG. 5 above may suffer from screen switching artifacts at the interface between the DETAIL_ON_WHITE.YES and DETAIL_ON_WHITE.NO tags, assuming a different screen is used for the "YES" assignment. In both cases, the image quality benefits relative to default object-based rendering can be significant.

Figure 6:
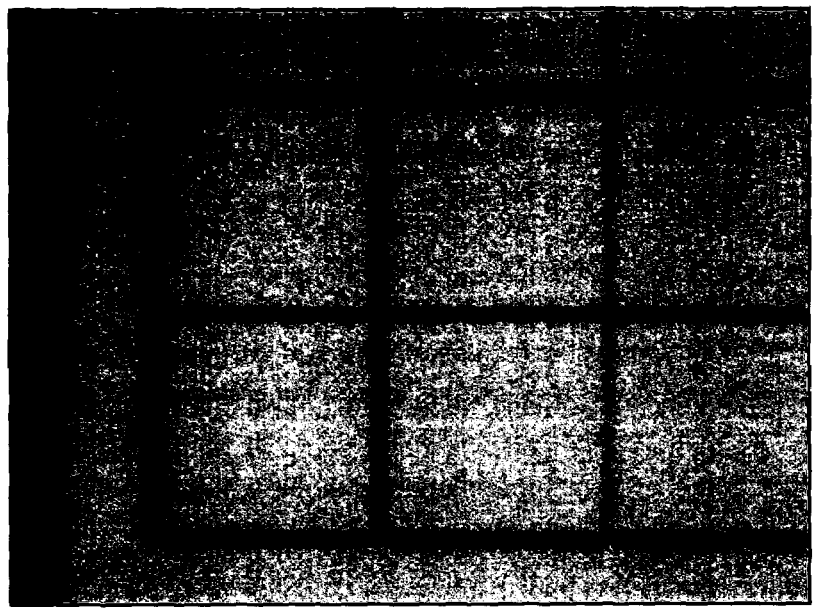
FIG. 6 is a micrograph showing rendering using a default object to halftone mapping, without Object on White tagging.
Figure 7:
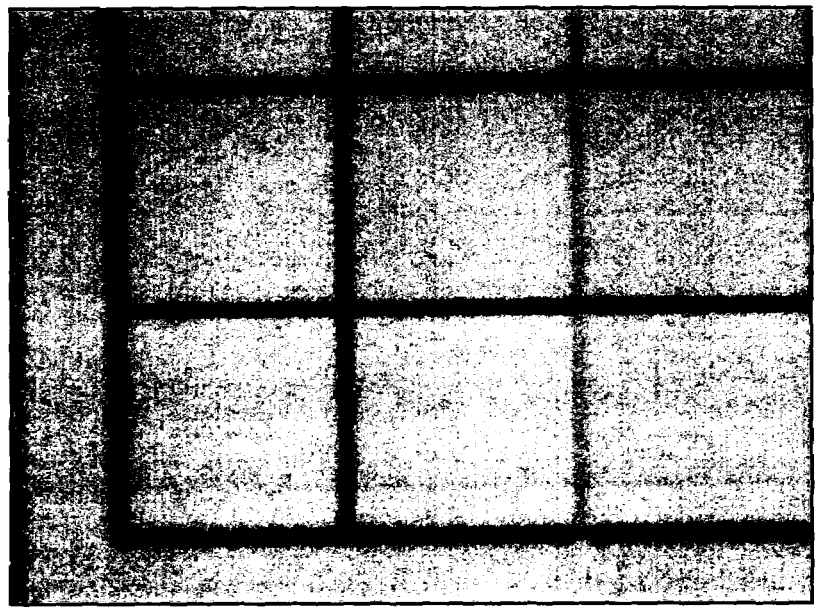
FIG. 7 is a micrograph showing rendering of the same region with Object on White tagging.

FIG. 6 is a micrograph which illustrates rendering using a default object to halftone mapping, without Object on White ("Detail on White") tagging. FIG. 7 is a micrograph which illustrates rendering of the same region with "Detail on White" tagging.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for optimizing rendering of objects to be printed on a white background, comprising:

identifying an object of a particular type to be printed on a white background, wherein objects of the particular type have predefined rendering hints associated with them, which predefined rendering hints provide optimized rendering of the objects of the particular type on non-white backgrounds;

associating a new tag called "object on white" with the identified object;

defining a new rendering hint for rendering the object of the particular type on a white background with the identified object; and rendering objects with the object on white tag according to the new rendering hint.

2. The method of claim 1, further comprising providing additional edge rendering hints and associating the object on white tag with the additional edge rendering hints.

3. The method of claim 1, wherein the object on white is at least one of a text object, a line art object.

4. The method of claim 1, wherein the object on white comprises a run.

5. The method of claim 1, wherein the object comprises at least one pixel.

6. The method of claim 1, wherein the object on white tag is assigned to a portion of the identified object.

7. The method of claim 1, wherein the white background corresponds to colors lighter than a specified threshold.

8. The method of claim 7, wherein the specified threshold is at least $L^*=70$ relative to paper white in CIELAB color space.

* * * * *